(12) United States Patent
Kobayashi

(10) Patent No.: US 8,032,901 B2
(45) Date of Patent: Oct. 4, 2011

(54) DISK DEVICE AND ELECTRONIC APPARATUS

(75) Inventor: Yutaka Kobayashi, Musashino (JP)

(73) Assignee: TEAC Corporation, Tama-shi, Tokyo (JP)

( * ) Notice: Subject to any disclaimer, the term of this patent is extended or adjusted under 35 U.S.C. 154(b) by 518 days.

(21) Appl. No.: 12/238,338

(22) Filed: Sep. 25, 2008

(65) Prior Publication Data

US 2009/0172719 A1 Jul. 2, 2009

(30) Foreign Application Priority Data

Dec. 26, 2007 (JP) .................................. 2007-334135

(51) Int. Cl.
*G11B 17/04* (2006.01)

(52) U.S. Cl. ..................................................... 720/655

(58) Field of Classification Search .................. None
See application file for complete search history.

(56) References Cited

U.S. PATENT DOCUMENTS

| 6,490,242 | B1 * | 12/2002 | Bonn et al. | 720/738 |
| 7,007,283 | B2 * | 2/2006 | Lin | 720/600 |
| 2005/0086676 | A1 * | 4/2005 | Hunter et al. | 720/655 |
| 2006/0259917 | A1 * | 11/2006 | Tokunaga | 720/649 |

FOREIGN PATENT DOCUMENTS

| JP | 7-111076 A | 4/1995 |
| JP | 7-130137 A | 5/1995 |

* cited by examiner

*Primary Examiner* — Mark Blouin

(74) *Attorney, Agent, or Firm* — Seed IP Law Group PLLC

(57) ABSTRACT

An optical disk drive includes a device body. A turntable is disposed on the device body, for rotating a disk. There is an optical pickup head for reading and/or writing of data with the disk. A multi-segment cover assembly is shiftable between a folded position and a spread position. The multi-segment cover assembly, when in the folded position, allows loading and unloading of the disk on the turntable, and when in the spread position, has a larger area than when in the folded position, and contains and protects the disk on the turntable. The multi-segment cover assembly includes a plurality of pie-shaped cover sectors, rotatable about an axis defined concentrically with the turntable, for extending to nest in one another when in the folded position, and for spreading by offsetting from one another when in the spread position.

14 Claims, 13 Drawing Sheets

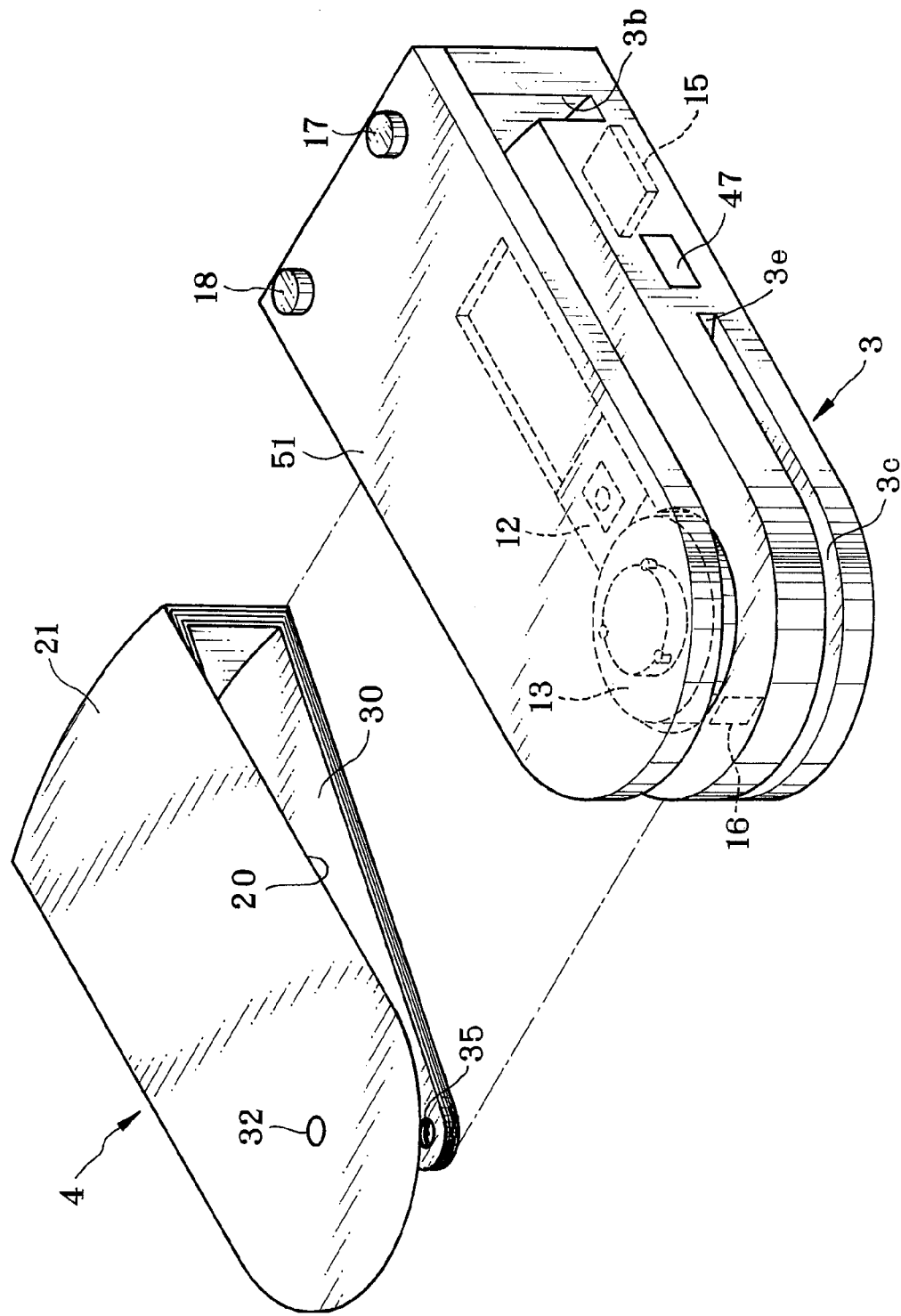

DISK DEVICE AND ELECTRONIC APPARATUS

BACKGROUND OF THE INVENTION

1. Field of the Invention

The present invention relates to a disk device and electronic apparatus. More particularly, the present invention relates to a disk device and electronic apparatus, in which a disk can be loaded in a safely protected manner.

2. Description Related to the Prior Art

A disk device, disk drive or disk player is loaded with a disk on a turntable. An optical pickup head is shifted to read data from a disk or write data to a disk at a high density. The disk device is externally connected with a notebook personal computer, or is incorporated in the notebook personal computer as an electronic apparatus. As the notebook personal computer is portable, there is a requirement of reducing the size of the disk device for the purpose of size reduction of the entirety of the notebook personal computer.

JP-A 7-130137 (corresponding to JP-B 3003481) discloses a built-in type. A device body of the disk device has such a small size as to correspond to a small disk with a diameter of 8 cm, for the purpose of reducing the size of the disk device. To use the disk device with a large disk with a diameter of 12 cm, the disk is partially protrudes externally from the device body while the disk device or the disk is contained in the personal computer.

JP-A 7-111076 discloses an externally connectable type of the disk device. An upper pickup unit is combined with a lower pickup unit in an openable manner. The lower pickup unit is constituted by a drive shaft for a disk and the optical pickup head. Thus, the disk device has a U shape as viewed laterally as entirety. The lower and upper pickup units have a smaller size than the disk. A disk cartridge including a disk and a cartridge in a quadrilateral shape for containing the disk is used, for example, floppy disk (trade name) of 3.5 inches. The disk is rotated in the disk cartridge, so as to protect difficulties, such as breakage of the disk, injury of a user's fingers and the like.

According to the disk device of JP-A 7-130137 (corresponding to JP-B 3003481), the device body movable into and out of the notebook personal computer has a size smaller than the disk. However, there is a limit in reduction of the size of the notebook personal computer, because a disk must be contained in the notebook personal computer.

Also, a special type of the disk cartridge is required for the disk device of JP-A 7-111076 for the purpose of preventing injury of fingers and breakage of the disk. Disks of a widely available type at present are a type of a cartridge-free structure. The structure of the document cannot be used for this available type of disks.

SUMMARY OF THE INVENTION

In view of the foregoing problems, an object of the present invention is to provide a disk device and electronic apparatus, in which a disk can be loaded in a safely protected manner.

In order to achieve the above and other objects and advantages of this invention, a disk device includes a disk device includes a turntable for rotating a disk. There is a pickup head for reading and/or writing of data on the disk. A device body has the turntable and the pickup head positioned thereon. A cover assembly is secured to the device body in a shiftable manner between a folded position and a spread position, for allowing loading and unloading of the disk on the turntable when in the folded position, and for spreading by making a turn when in the spread position, to cover and protect the disk on the turntable.

The cover assembly has an insertion opening, and the insertion opening is open to receive insertion of the disk when the cover assembly is in the folded position, and is closed when the cover assembly is in the spread position.

The cover assembly is transparent to set the disk visible externally.

The cover assembly includes plural rotatable cover sectors, having a rotational axis concentric with the turntable, and having sizes different from one another so as to nest in one another when in the folded position. Each of the cover sectors have an upper plate portion for covering an upper surface of the disk, a lower plate portion for covering a lower surface of the disk, and a peripheral portion opposed to a peripheral edge of the disk. A transmission mechanism interconnects the cover sectors positioned adjacently, and rotates a first one of the cover sectors by transmission when a second one of the cover sectors adjacent to the first cover sector rotates toward the spread position or the folded position.

Furthermore, a lower recess is formed in the device body, for containing the lower plate portion when the cover assembly is in the folded position.

Furthermore, an upper arm is disposed to extend from the device body, and positioned higher than the turntable. A pivot portion supports the upper plate portion of the cover sectors on a lower surface of the upper arm.

The plural cover sectors are first to Nth cover sectors arranged in an outward direction in a nested form. When the Nth cover sector rotates, the transmission mechanism rotates the cover sectors sequentially from the (N−1)th cover sector.

The transmission mechanism includes first and second follower projections formed to project from first and second edge portions of an outer surface of each of the first to (N−1)th cover sectors. A drive projection is formed to project from one edge portion of an inner surface of the second to Nth cover sectors, for engagement with the first follower projection upon rotation toward the spread position, and for engagement with the second follower projection upon rotation toward the folded position.

Furthermore, a deployment sensor detects whether the cover assembly has come to the spread position. A controller allows the turntable to rotate when the deployment sensor detects that the cover assembly has come to the spread position.

Furthermore, a retaining mechanism retains the cover assembly in the spread position.

Furthermore, a stop sensor detects whether rotation of the turntable has stopped. The retaining mechanism releases retention of the cover assembly when the stop sensor has detected that rotation of the turntable has stopped.

The retaining mechanism includes an attracting plate secured to a foremost one of the cover sectors with respect to a rotational direction toward the spread position. A magnet is positioned on the device body, for attracting the attracting plate.

In one aspect of the invention, an electronic apparatus has a disk device including a turntable for rotating a disk, and a pickup head for reading and/or writing of data on the disk. The electronic apparatus includes a main body having the disk device positioned on a periphery thereof. A cover assembly is secured to the main body in a shiftable manner between a folded position and a spread position, for allowing loading and unloading of the disk on the turntable when in the folded position, and for spreading by making a turn when in the spread position, to cover and protect the disk on the turntable on an outside of the main body.

The cover assembly is disposed at a corner of the main body.

Consequently, a disk can be loaded in a safely protected manner, because the cover assembly can be shifted for folding and deploying, and can protect the disk in the course of rotation for reading or writing.

BRIEF DESCRIPTION OF THE DRAWINGS

The above objects and advantages of the present invention will become more apparent from the following detailed description when read in connection with the accompanying drawings, in which:

FIG. 9 is an exploded perspective illustrating another preferred disk device having an upper arm;

DETAILED DESCRIPTION OF THE PREFERRED EMBODIMENT(S) OF THE PRESENT INVENTION

Figure 1:
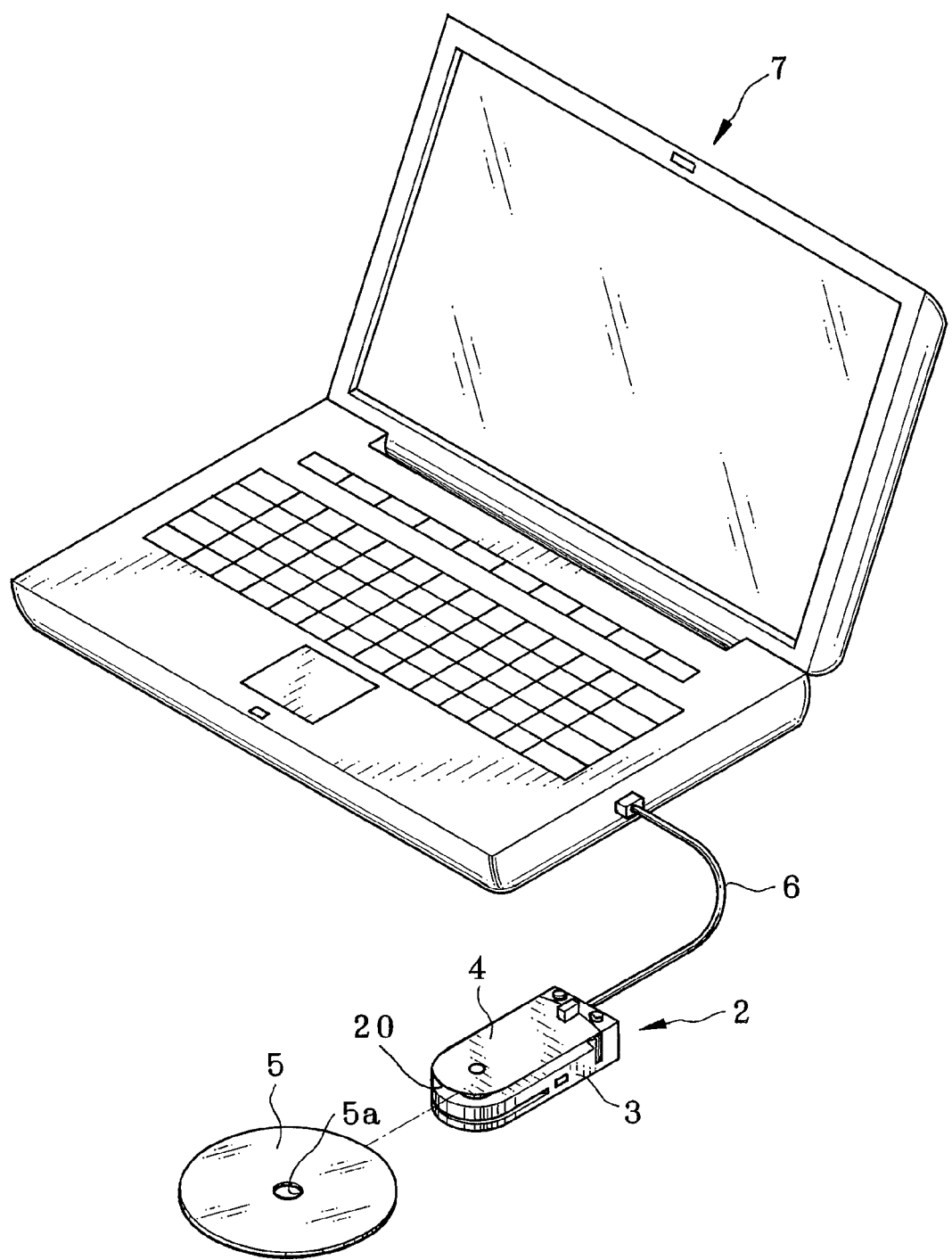
FIG. 1 is a perspective view illustrating a disk device and a notebook personal computer.

In FIG. 1, a disk device 2 or disk drive as disk player includes a device body 3 and a multi-segment cover assembly 4. A disk 5 or CD as optical information recording medium includes a center hole 5a, and is inserted between the device body 3 and the multi-segment cover assembly 4. To use the disk device 2, a connection cable 6 is connected between a notebook personal computer 7 and the disk device 2 for transmission of data.

Figure 2:
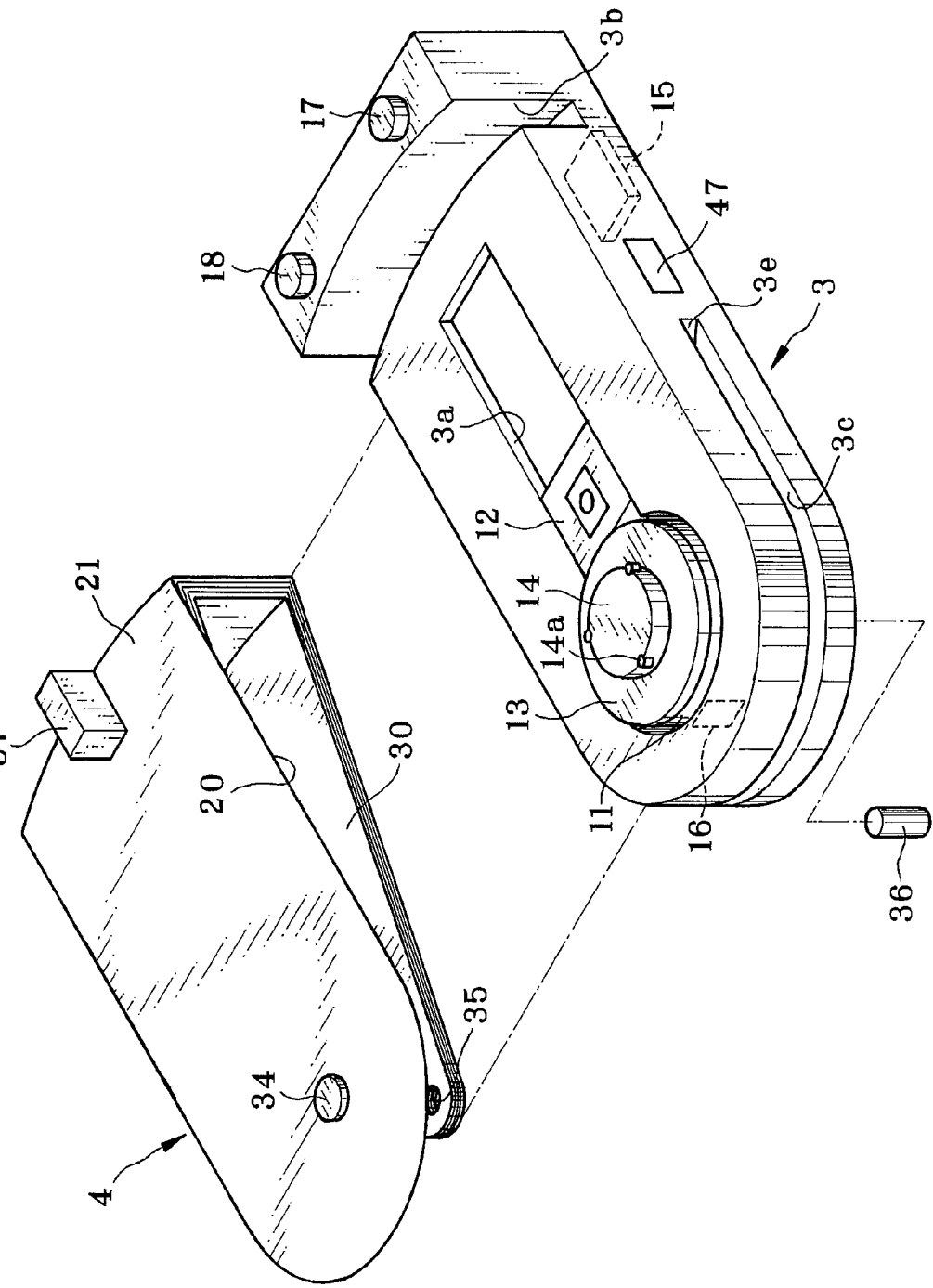
FIG. 2 is an exploded perspective illustrating a device body and a multi-segment cover assembly.

In FIG. 2, a spindle motor 11 and an optical pickup head 12 are incorporated in the device body 3 as a drive assembly. The spindle motor 11 rotates the disk 5. The optical pickup head 12 optically reads data from the disk 5 and writes data to the same.

A turntable 13 is secured to an output shaft of the spindle motor 11, and supports the disk 5. A chuck head 14 of the turntable 13 is inserted in the center hole 5a of the disk 5. Chuck claws 14a in the chuck head 14 are biased with a spring, and keep the disk 5 mounted in a removable manner.

An access opening 3a is formed in the device body 3. The optical pickup head 12 is inserted in the access opening 3a, and is movable in a radial direction of the disk 5 by a moving mechanism well-known in the field of the disk drive.

A controller 15 is contained in the device body 3. When a command signal is generated in the notebook personal computer 7, the controller 15 responsively controls the spindle motor 11 and the optical pickup head 12. A stop sensor 16 is disposed in the device body 3. Rotation of the turntable 13 is monitored by the stop sensor 16, which detects a stop of the turntable 13 and sends stop information to the controller 15.

A power button 17 is disposed on an upper face of the device body 3 for powering the disk device 2. An eject button 18 on the upper face of the device body 3 is operable for releasing retention of the multi-segment cover assembly 4 in a deployed state of FIG. 3, to allow removal of the disk 5.

The multi-segment cover assembly 4 is for enclosure by telescoping from a nested form for disk protection in a paper lantern shape. The multi-segment cover assembly 4 is associated with the device body 3 in a rotatable manner, and shifts between folded and spread positions. When the multi-segment cover assembly 4 is in the folded position of FIGS. 1 and 2, the disk 5 is loaded to or unloaded from the turntable 13 through an insertion opening 20. When the multi-segment cover assembly 4 is in the spread position of FIGS. 3 and 4, the multi-segment cover assembly 4 is deployed by making one turn in a circular form to enclose the entirety of the disk 5. A lateral channel 3b is formed in the device body 3, and contains nested peripheral portions of the multi-segment cover assembly 4. A lower recess 3c is formed in the device body 3, and contains nested lower plate portions of the multi-segment cover assembly 4. When the multi-segment cover assembly 4 is in the folded position, upper portions of the optical pickup head 12 and the turntable 13 are covered in the multi-segment cover assembly 4.

Figure 3:
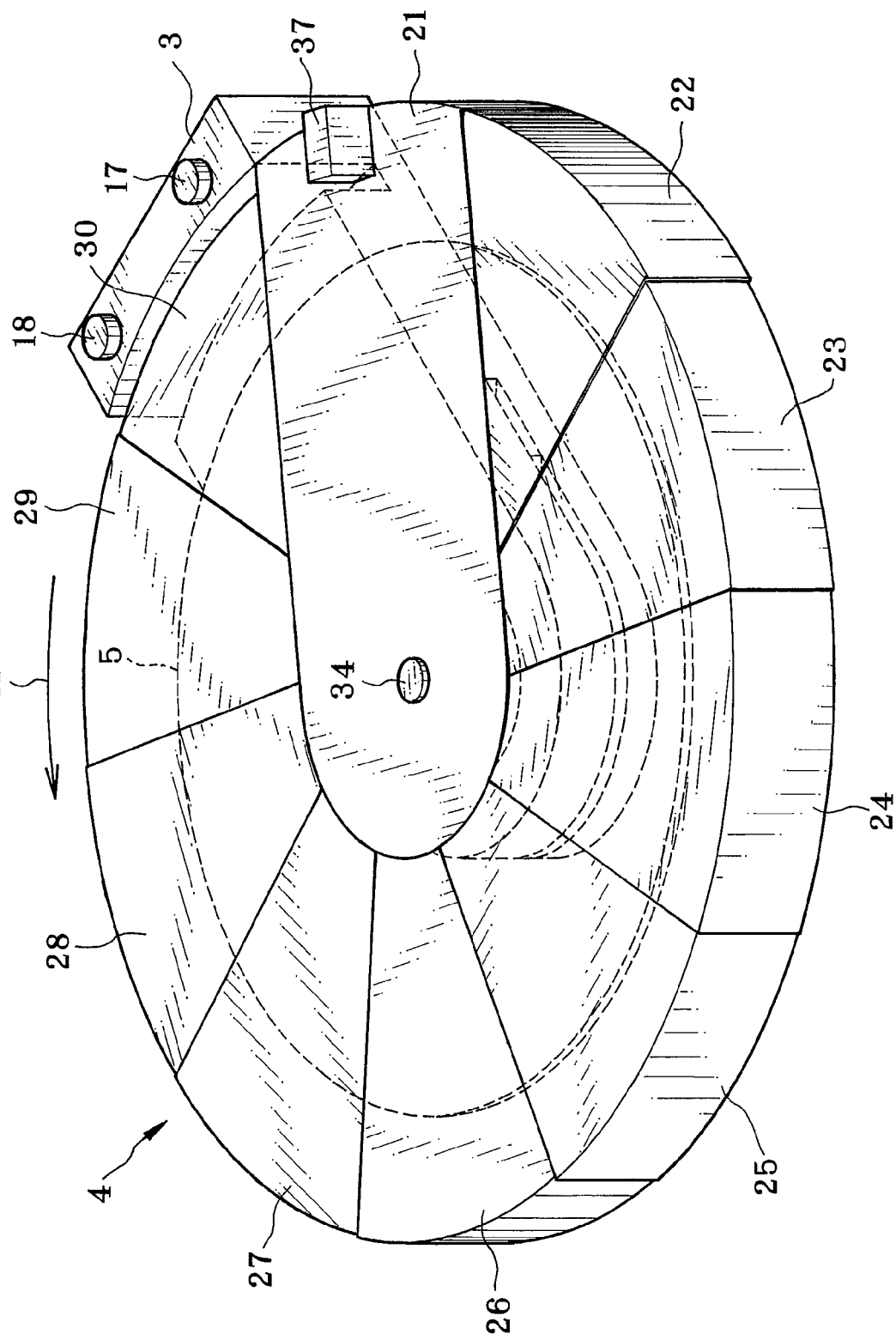
FIG. 3 is a perspective view illustrating the multi-segment cover assembly in a spread position.
Figure 4:
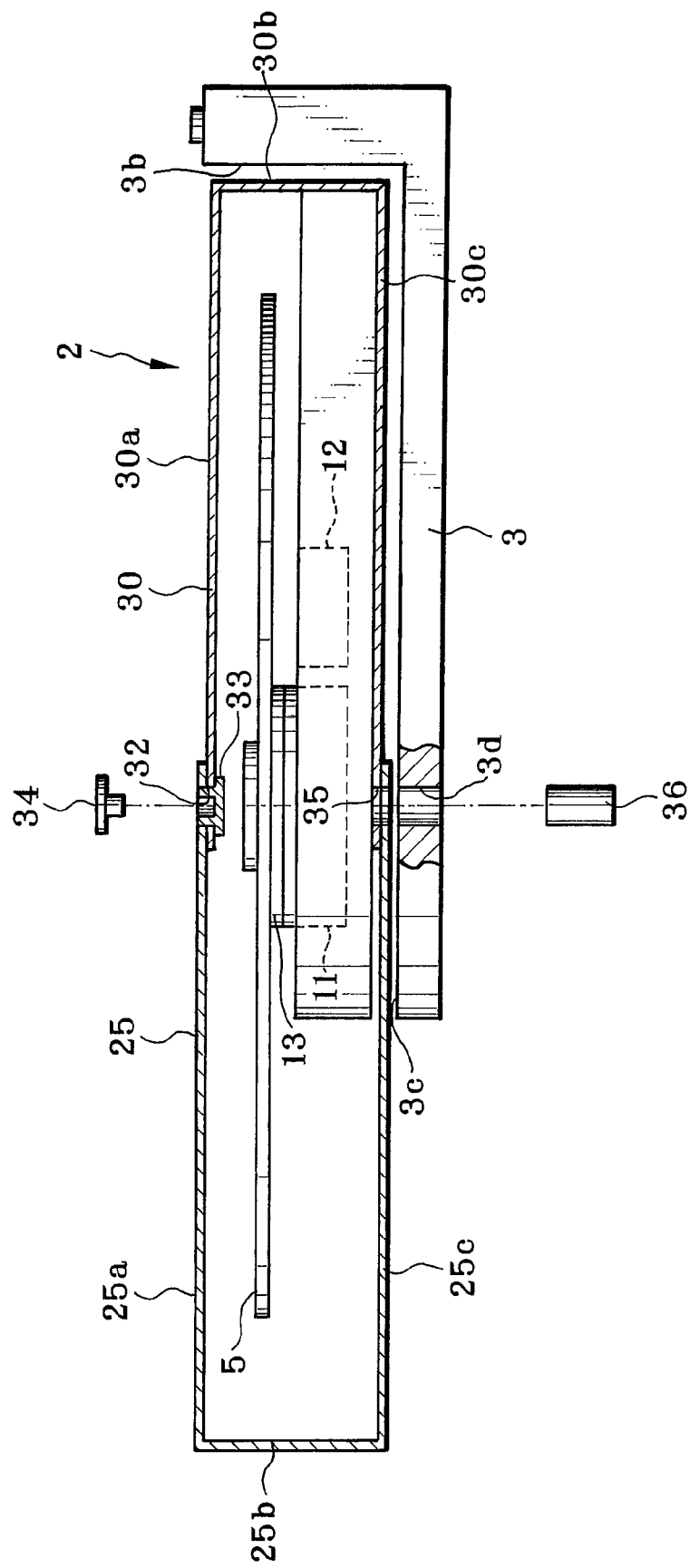
FIG. 4 is a side elevation, partially broken, illustrating the disk device.
Figure 5:
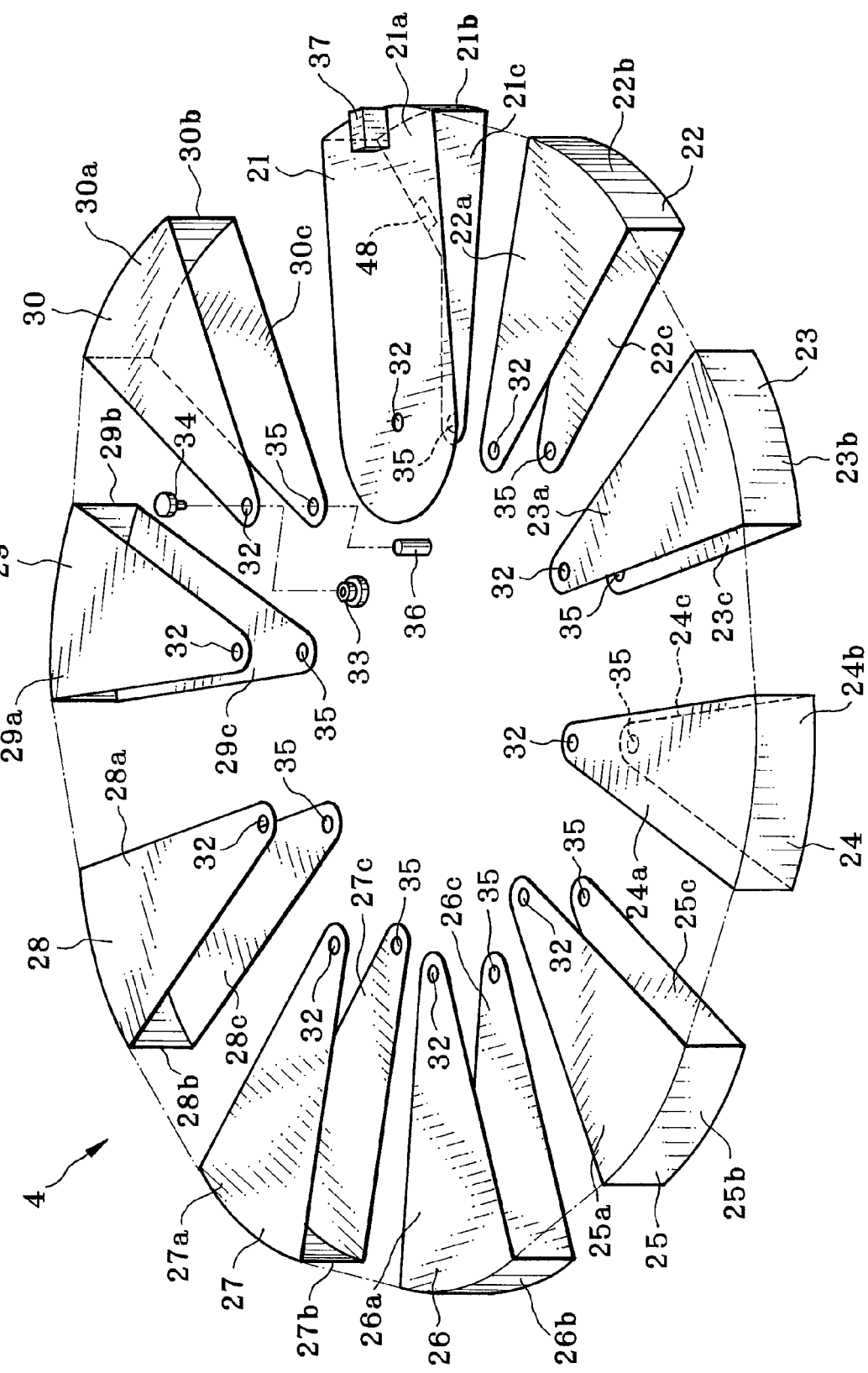
FIG. 5 is an exploded perspective illustrating the multi-segment cover assembly.

In FIGS. 3 and 5, the multi-segment cover assembly 4 is constituted by first to tenth pie-shaped cover sectors 21-30 for enclosure, which are formed from polycarbonate or the like. The cover sectors 21-30 have sizes increasing in the outward direction. The cover sectors 21-30 include upper plate portions 21a-30a, peripheral portions 21b-30b, and lower plate portions 21c-30c, and are respectively in a U shape as viewed laterally. The second cover sector 22 is disposed inside the first cover sector 21, the cover sector 23 inside the second cover sector 22. The cover sectors 21-30 are nested in one another in the order from the tenth cover sector 30 to the first cover sector 21. Note that the cover sectors 26-29 are not illustrated in FIG. 4 as elements between the cover sectors 25 and 30. The material of polycarbonate for the cover sectors 21-30 may be transparent or opaque. If the transparent material is used, the disk 5 is visible externally in the spread position.

An upper pivot hole 32 is formed in each of the upper plate portions 21a-30a. An upper pivot pin 33 is inserted in the upper pivot hole 32. A rod cap 34 is retained to the upper pivot pin 33 to keep the upper plate portions 21a-30a rotatable thereabout.

A lower pivot hole 35 is formed in each of the lower plate portions 21c-30c, and concentric with the upper pivot hole 32.

A lower pivot pin 36 is inserted in the lower pivot hole 35. In FIG. 4, a through hole 3d in the device body 3 receives the lower pivot pin 36 for retention. The lower plate portions 21c-30c are rotatable about the lower pivot pin 36.

The lower pivot pin 36 is positioned concentrically with the turntable 13. The cover sectors 21-30 rotate about the axis defined at the lower pivot pin 36.

A tab or grip 37 projects from the first cover sector 21. When the first cover sector 21 is rotated by manually moving the grip 37, the multi-segment cover assembly 4 rotates. Each of the cover sectors 21-30 is as thin a plate as 0.2 mm, but is not deformed even upon occurrence of shock, vibration or the like of the disk device 2 in an ordinary state.

Figure 6:
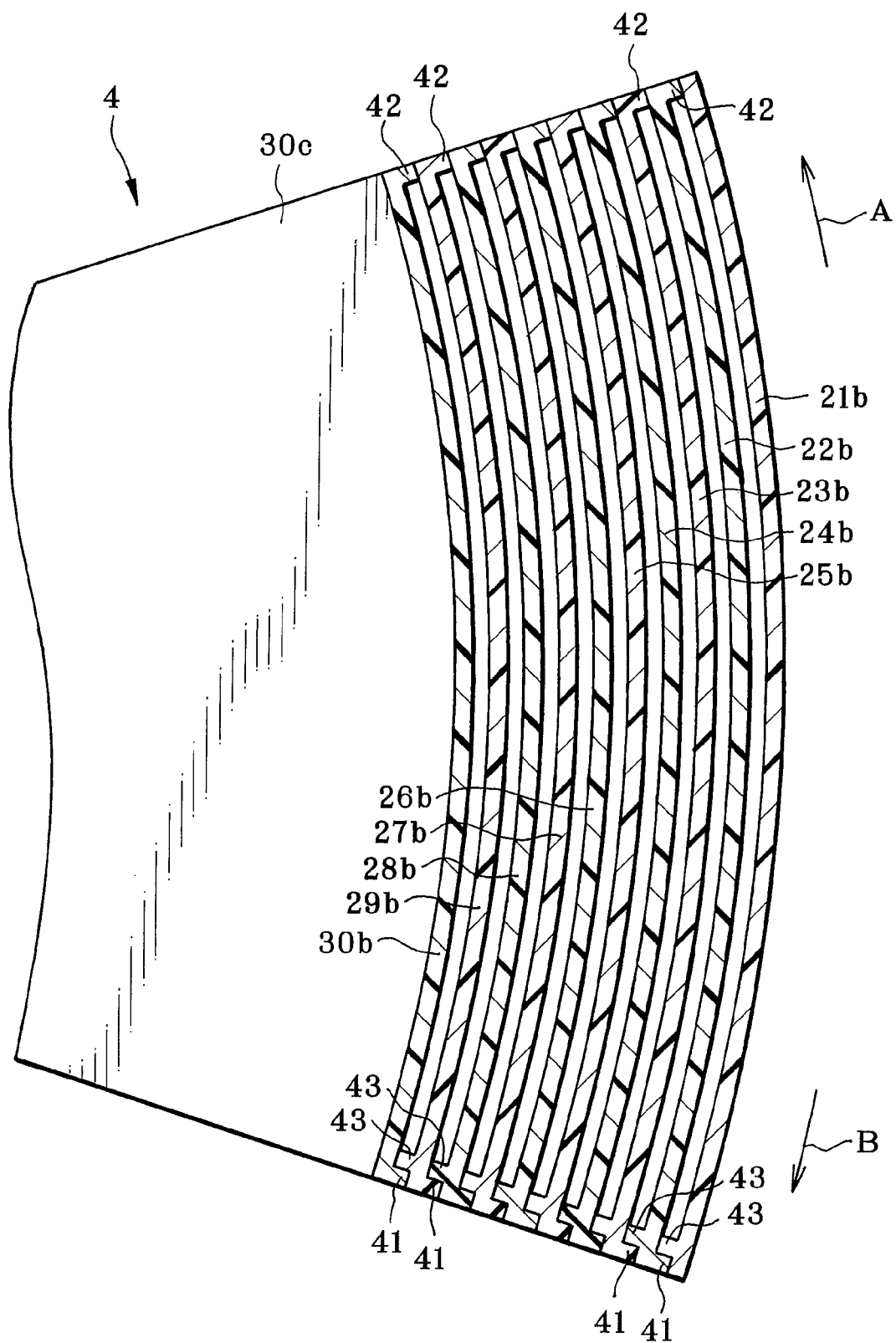
FIG. 6 is a horizontal section, partially broken, illustrating the multi-segment cover assembly in a folded position.

In FIG. 6, a first follower projection 42 for deployment and a second follower projection 41 for folding are formed with each of the peripheral portions 22b-30b as transmission mechanism. A drive projection 43 is formed with each of the peripheral portions 21b-29b. The drive projection 43, when rotated from the folded position to the spread position in a direction A, contacts the first follower projection 42, and when rotated from the spread position to the folded position in a direction B, contacts the second follower projection 41. Note that in FIG. 5, the first and second follower projections 42 and 41 and the drive projection 43 are not shown for the purpose of simplicity.

Figure 7A:
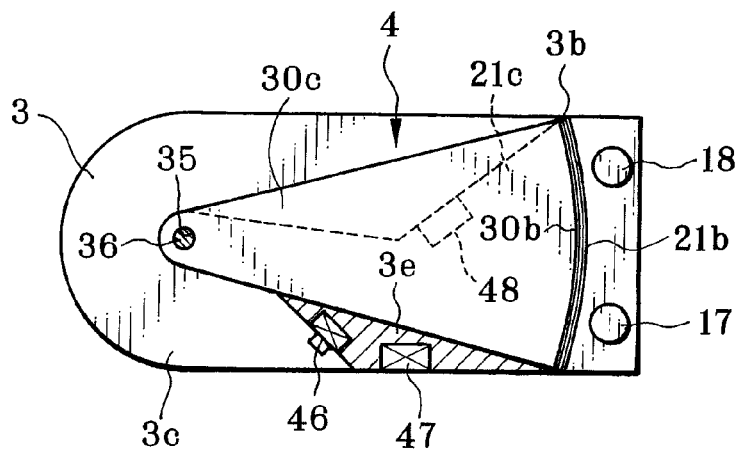
FIG. 7A is a top plan illustrating the device body and the multi-segment cover assembly with the intermediate portion in a cut state.
Figure 7B:
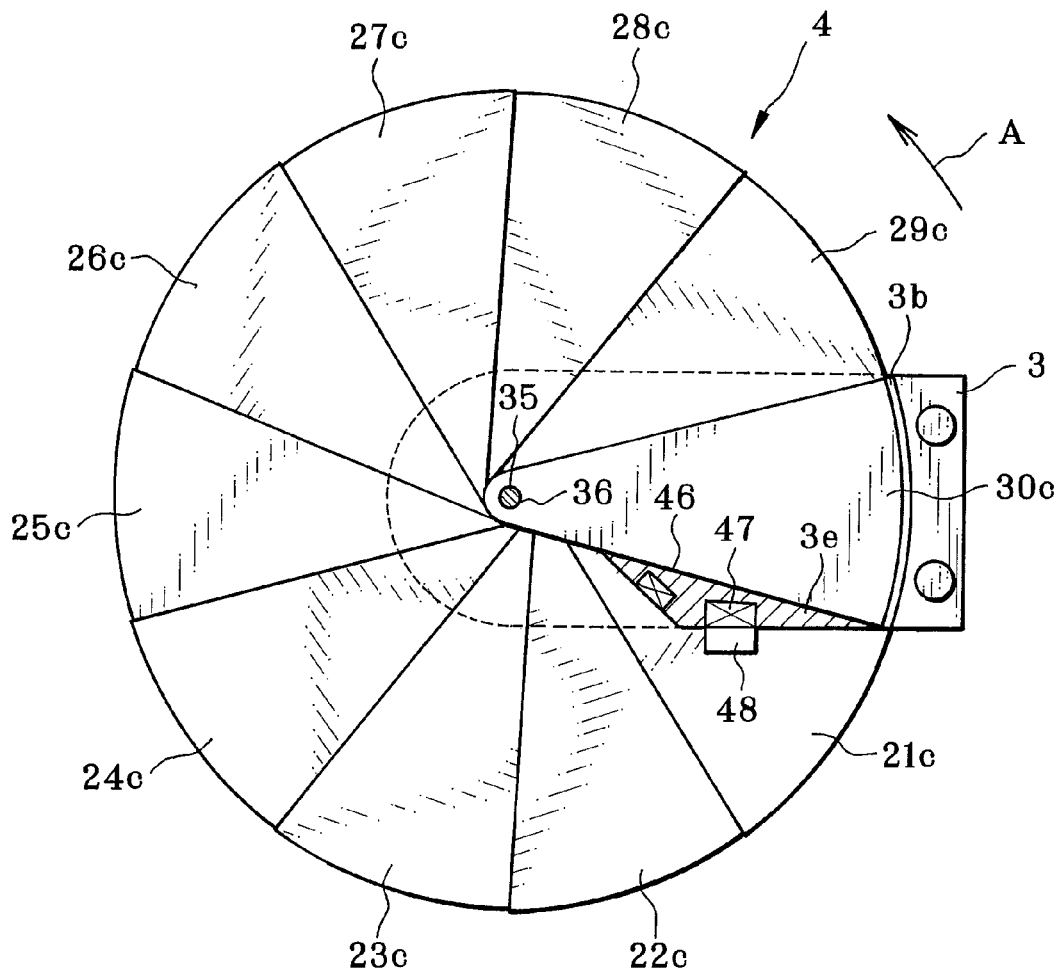
FIG. 7B is a top plan illustrating the same as FIG. 7A but in the spread position.

In FIGS. 2, 7A and 7B, there is an intermediate portion 3e as a block connecting upper and lower portions of the device body 3 in relation to the lower recess 3c. FIGS. 7A and 7B are plans of the device body 3 and the multi-segment cover assembly 4, in which the intermediate portion 3e is depicted partially in a section. In FIG. 7A, the folded position is depicted. The peripheral portions 21b-30b are contained in the lateral channel 3b in the device body 3. The lower plate portions 21c-30c are contained in the lower recess 3c. In FIG. 7B, the lower plate portion 21c of the first cover sector 21 in the spread position contacts the intermediate portion 3e firmly to close the insertion opening 20. The tenth cover sector 30 is fixedly secured to the device body 3 in the state of FIG. 7B.

A deployment sensor 46 as deployment detecting switch is secured to the intermediate portion 3e for detecting the state of the multi-segment cover assembly 4 in the spread position. When the multi-segment cover assembly 4 rotates to the spread position in FIG. 7B, the lower plate portion 21c depresses the deployment sensor 46. In response to this, the deployment sensor 46 generates a completion signal of deployment, and sends it to the controller 15.

An electromagnet 47 as retaining mechanism is secured to the intermediate portion 3e. The controller 15 controls to supply the electromagnet 47 with power. An attracting plate of metal 48 on the lower plate portion 21c is attracted by the electromagnet 47 creating a magnetic field in response to powering.

The operation of the disk device 2 is described now. At first, the disk device 2 is connected with the notebook personal computer 7. In FIG. 1, the multi-segment cover assembly 4 is in the folded position. For reading and writing on the disk 5 in the disk device 2, the disk 5 is inserted between the device body 3 and the multi-segment cover assembly 4, to fit the portion of the center hole 5a on the turntable 13.

Figure 8A:
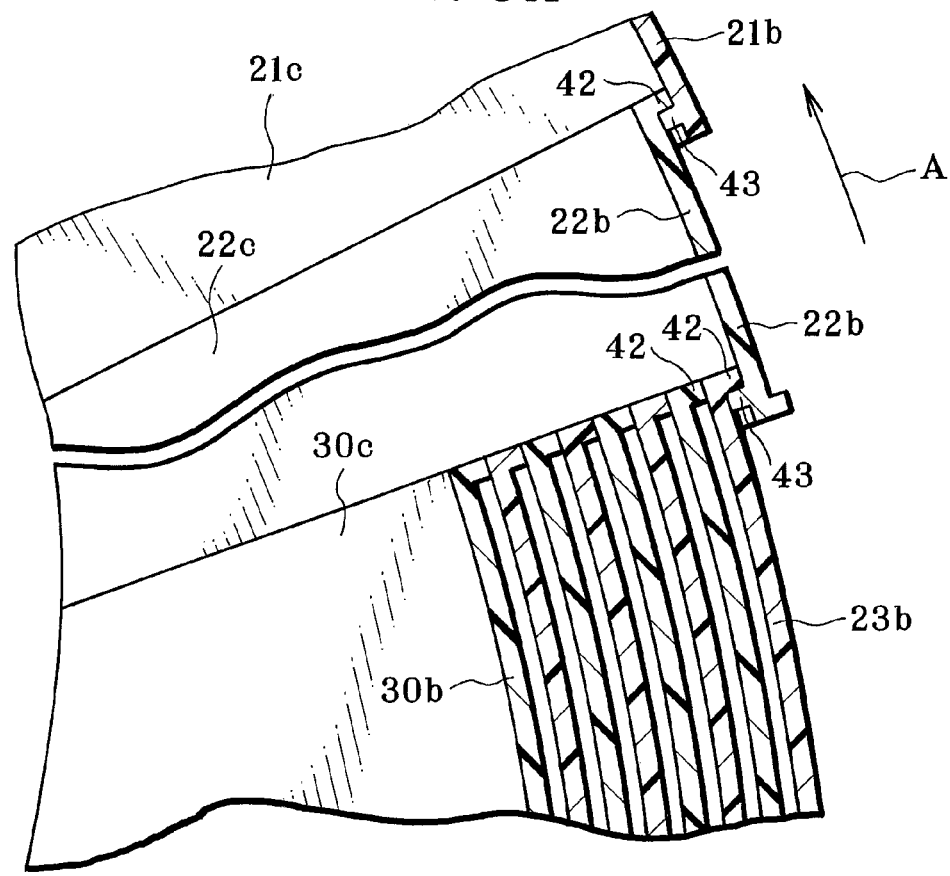
FIG. 8A is a horizontal section, partially broken, illustrating the multi-segment cover assembly rotating toward the spread position.

Then the multi-segment cover assembly 4 is rotated to the spread position of FIG. 3. In FIG. 8A, the first cover sector 21 is rotated in the direction A. In response to this, the drive projection 43 on the first cover sector 21 contacts the first follower projection 42 on the second cover sector 22. Further rotation of the first cover sector 21 causes the second cover sector 22 to rotate in the direction A.

When the second cover sector 22 rotates in the direction A, the drive projection 43 of the second cover sector 22 contacts the first follower projection 42 of the cover sector 23. Further rotation of the second cover sector 22 causes the cover sector 23 to rotate in the direction A. Similarly, the cover sectors 24, 25, 26, 27, 28 and 29 are sequentially caused to rotate in the direction A by the rotation of the first cover sector 21.

When the multi-segment cover assembly 4 is rotated to the spread position of FIGS. 3 and 7B, the lower plate portion 21c contacts the intermediate portion 3e to close the insertion opening 20. The deployment sensor 46 is turned on by the lower plate portion 21c, to send a completion signal to the controller 15 for the completion of the deployment. Upon occurrence of the completion signal, the controller 15 starts powering the electromagnet 47, and than allows the spindle motor 11 to rotate. The electromagnet 47 in response to this attracts the attracting plate 48 on the lower plate portion 21c, to keep the multi-segment cover assembly 4 deployed. The multi-segment cover assembly 4 can be kept from incidentally shifting toward the folded position even upon occurrence of shock, vibration or the like on the disk device 2.

Then the notebook personal computer 7 is operated to input a reading/writing signal to the controller 15. While the deployment sensor 46 generates the completion signal of the deployment, the controller 15 drives the spindle motor 11 in response to the reading/writing signal. The optical pickup head 12 reads data from or writes data to the disk 5. Note that the spindle motor 11 is not driven while no completion signal is generated even when the reading/writing signal is input. Therefore, the disk 5 can be protected while rotated without being uncovered.

To remove the disk 5 from the disk device 2, the eject button 18 is depressed. Then a removal signal is sent to the controller 15. In response to this, the controller 15 stops rotation of the spindle motor 11. Inertia occurs and causes the spindle motor 11 to rotate without immediate stop even after a command signal of the stop from the controller 15. Thus, the turntable 13 does not stop immediately. The stop sensor 16 detects stop of the turntable 13, and responsively sends stop information to the controller 15. The controller 15 responds to the removal signal and the stop information, and stops powering the electromagnet 47. The multi-segment cover assembly 4 can be kept from rotating toward the folded position while the disk 5 rotates.

When powering of the electromagnet 47 is stopped, the attracting plate 48 is released from the attraction, to unlock the multi-segment cover assembly 4 from the spread position. Thus, rotation of the multi-segment cover assembly 4 toward the folded position is enabled.

Figure 8B:
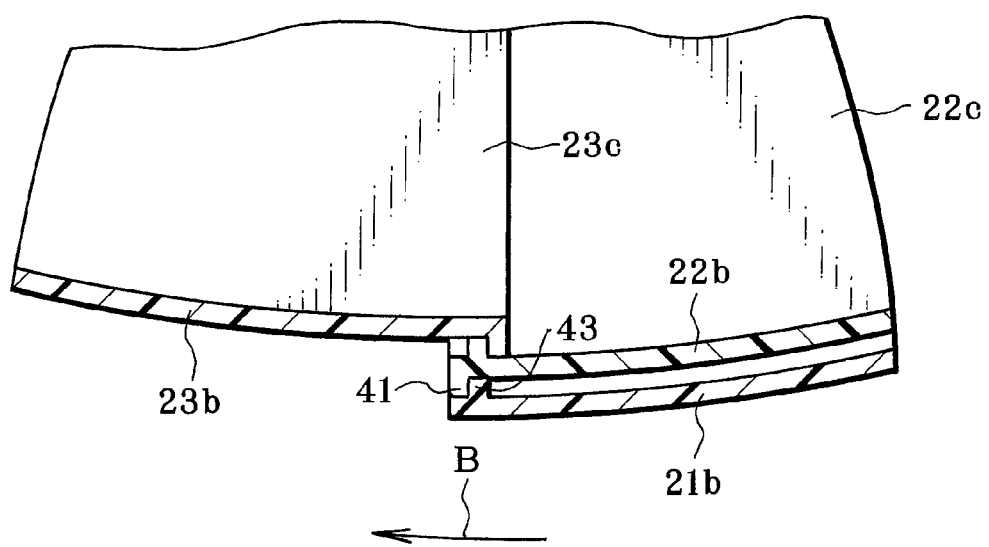
FIG. 8B is a horizontal section, partially broken, illustrating the multi-segment cover assembly after start of rotating the first cover sector.

Then the multi-segment cover assembly 4 is rotated to the folded position of FIGS. 1 and 6. As illustrated in FIG. 8B, the first cover sector 21 is rotated in the direction B. In response, the drive projection 43 of the first cover sector 21 contacts the second follower projection 41 of the second cover sector 22. Further rotation of the first cover sector 21 causes the second cover sector 22 to rotate in the direction B equally. Similarly, the cover sectors 23, 24, 25, 26, 27, 28 and 29 are caused to rotate serially in the direction B by rotation of the first cover sector 21. The multi-segment cover assembly 4 is rotationally shifted to the folded position, before the disk 5 is removed through the insertion opening 20.

In the embodiment, the first cover sector 21 positioned on the outermost side is rotated manually. Instead of this, it is possible manually to rotate the tenth cover sector 30 positioned on the innermost side. The first cover sector 21 of this structure is fixedly secured to the device body 3.

Figure 10:
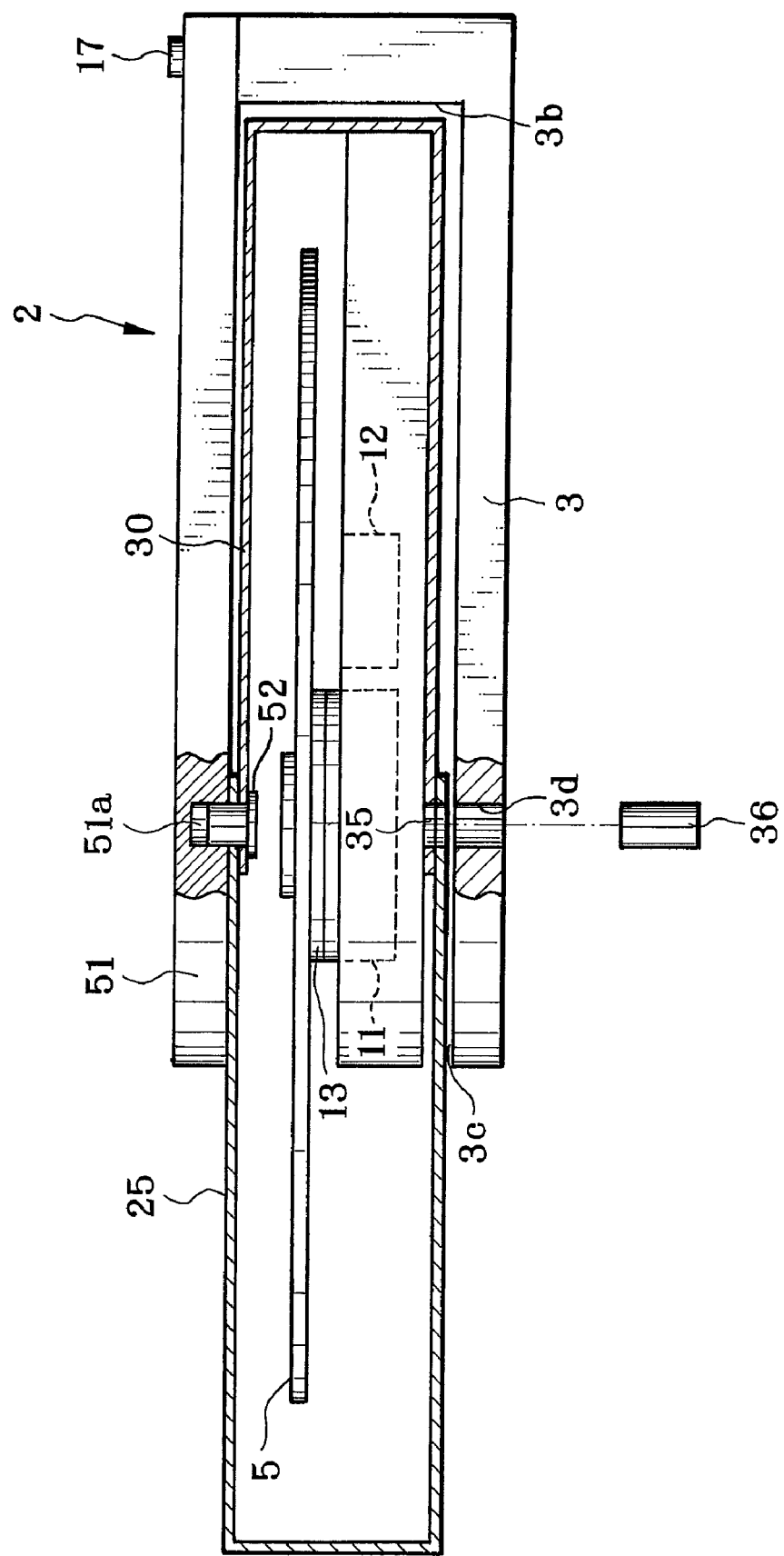
FIG. 10 is a side elevation, partially broken, illustrating an inner structure of the disk device.

In FIGS. 9 and 10, another preferred embodiment is illustrated. An upper arm 51 or jaw is secured to the device body 3. The multi-segment cover assembly 4 is disposed between the upper arm 51 and the device body 3. Elements similar to those of the above embodiment are designated with identical reference numerals. The upper arm 51 is disposed higher than the turntable 13. When the multi-segment cover assembly 4 is folded, the upper arm 51 covers the top of the upper plate portions 21a-30a. The power button 17 and the eject button 18 are incorporated in the upper arm 51. It is possible to form the upper arm 51 as a portion projecting from a surface of the device body 3 as one piece.

A pivot pin 52 is inserted through the upper pivot hole 32 in the upper plate portions 21a-30a as an axis of the cover sectors 21-30. A pivot hole 51a as pivot portion is formed in the upper arm 51, and receives insertion of the pivot pin 52. As the upper plate portions 21a-30a are kept rotatable on the upper arm 51 in the embodiment, operation of deployment and folding of the multi-segment cover assembly 4 can be stable.

The upper arm 51 can be secured to the device body 3 in a rotatable manner. A distal end of the upper arm 51 can rotate up about a pivot which is positioned at a proximal end having the power button 17 and the eject button 18. The upper plate portions 21a-30a and the peripheral portions 21b-30b of the cover sectors 21-30 are deformed, but become shaped in their original form when the upper arm 51 is rotated down. As the upper arm 51 is rotated up, setting of the disk 5 is facilitated because of a larger gap between the upper plate portion 30a and the device body 3.

Figure 11:
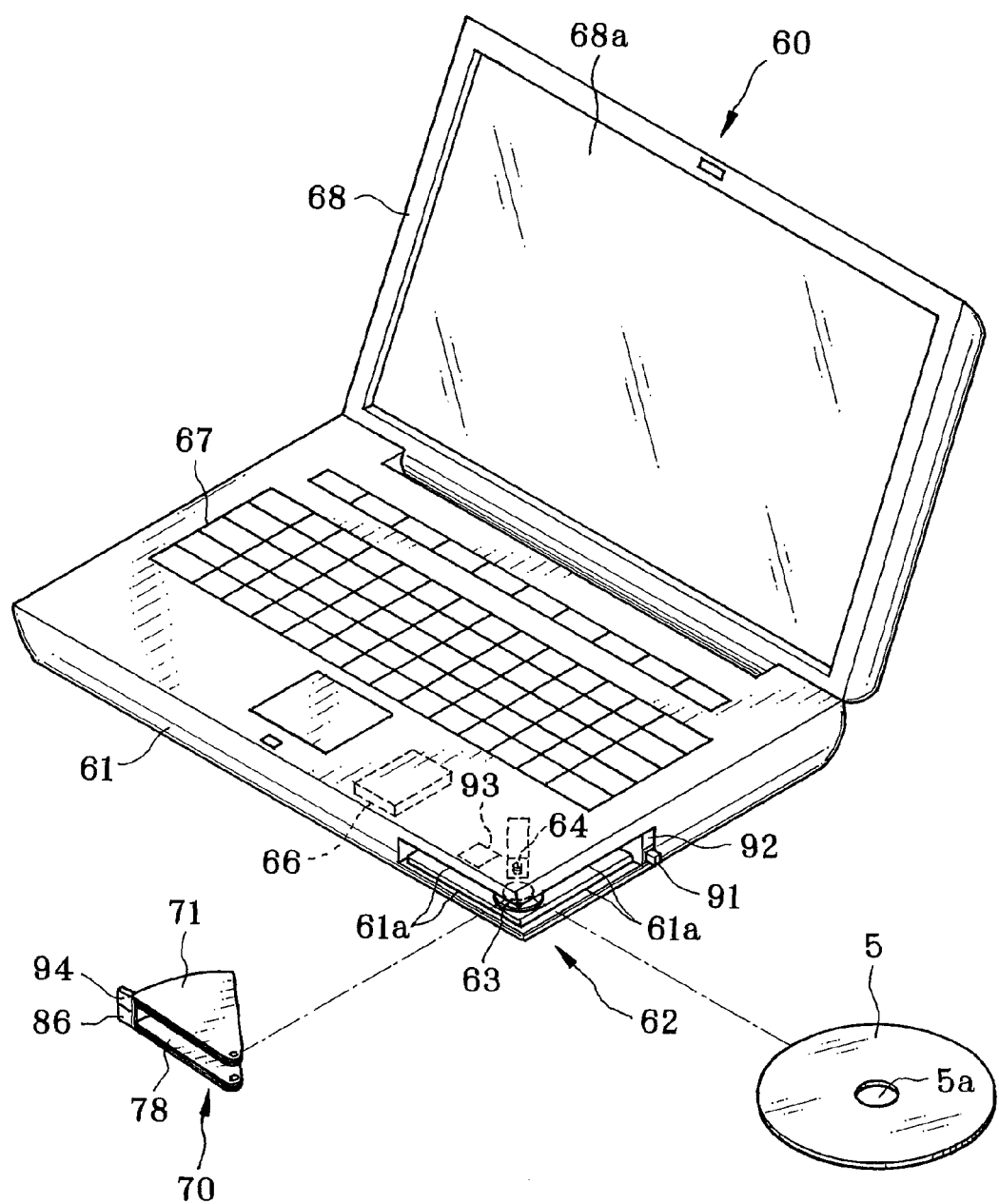
FIG. 11 is a perspective view illustrating one preferred embodiment in which the disk device is incorporated in a notebook personal computer.
Figure 12:
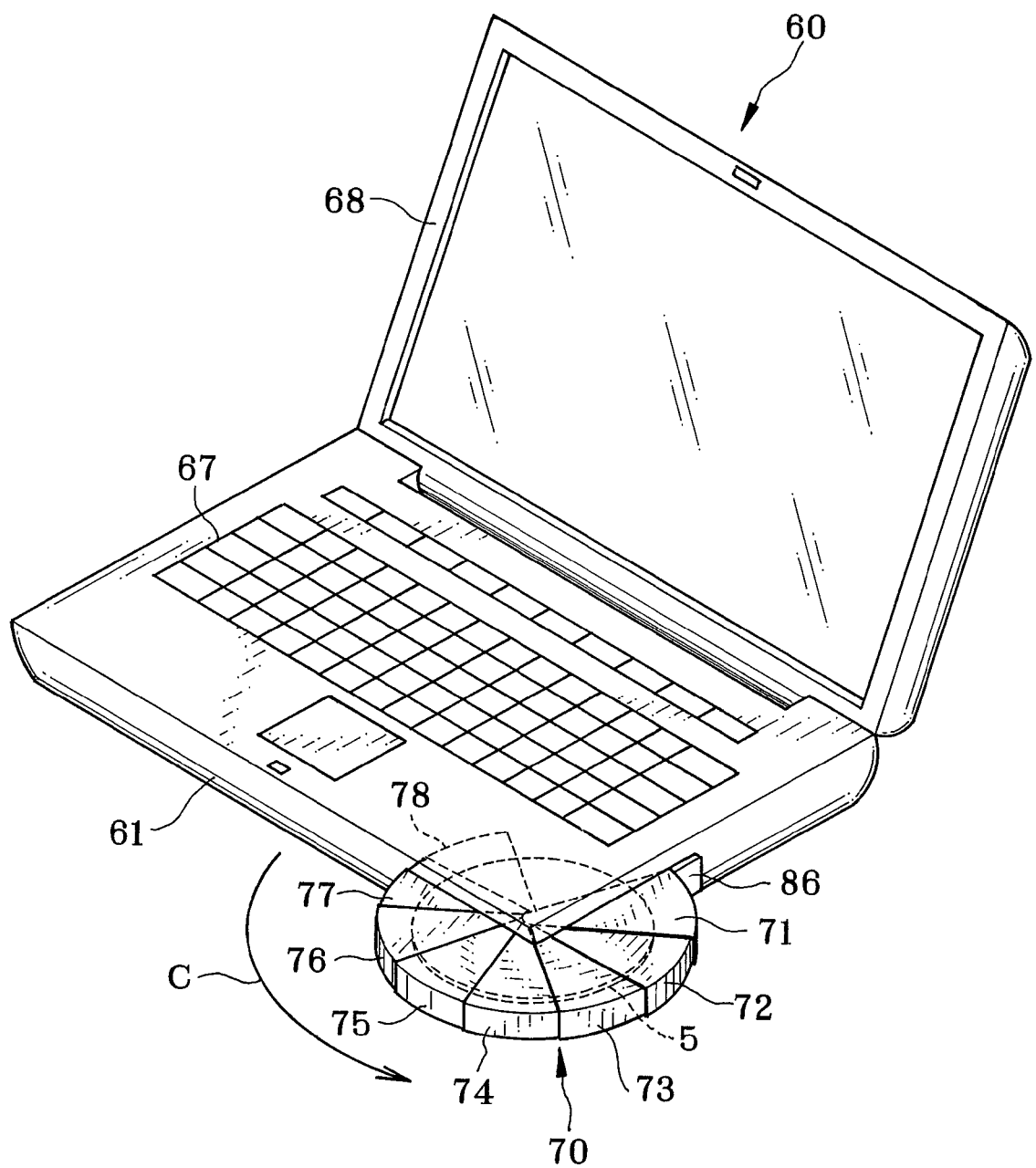
FIG. 12 is a perspective view illustrating the notebook personal computer with the multi-segment cover assembly in a spread position.
Figure 13:
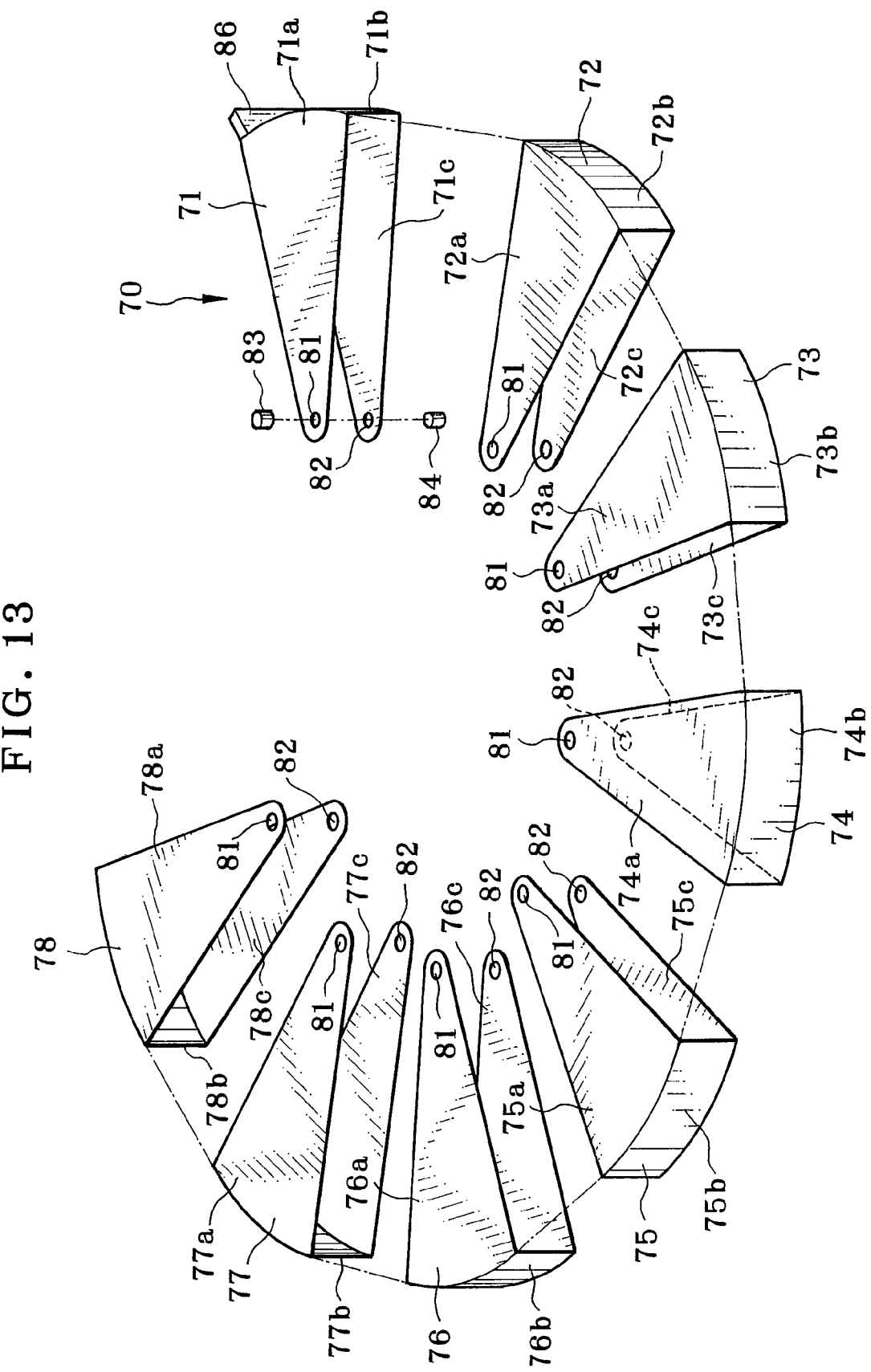
FIG. 13 is a exploded perspective illustrating the multi-segment cover assembly.

In FIGS. 11, 12 and 13, a notebook personal computer 60 of a third preferred embodiment is illustrated. Elements similar to those of the above embodiments are designated with identical reference numerals. The notebook personal computer 60 includes a main body 61 and a disk device 62 or disk drive as disk player disposed at a corner of the main body 61. Two insertion chambers 61a are formed in the main body 61. An upper one of those receives insertion of the disk 5.

The disk device 62 includes a turntable 63 and an optical pickup head 64. The turntable 63 supports the disk 5 mounted thereon. The optical pickup head 64 reads data from and write data to the disk 5. A portion of the disk 5 on the turntable 63 protrudes from the front and side of the main body 61.

A controller 66 is incorporated in the main body 61, and controls operation of the disk device 62. A keyboard 67 is disposed in the main body 61. The controller 66 operates according to control signal input with the keyboard 67. A computer lid 68 in the notebook personal computer 60 is disposed to open and close the main body 61. A display panel 68a is incorporated in the computer lid 68 and oriented to the inside.

A multi-segment cover assembly 70 is secured to the main body 61 in a rotatable manner, for enclosure by telescoping from a nested form for disk protection in a paper lantern shape. The multi-segment cover assembly 70, when rotationally set in the folded position of FIG. 11, is folded for loading and unloading of the disk 5, and when rotationally set in the spread position of FIG. 12, is deployed circularly to cover the disk 5 on the turntable 63. In the folded position, the multi-segment cover assembly 70 is contained in the insertion chambers 61a.

In FIG. 13, the multi-segment cover assembly 70 includes first to eighth pie-shaped cover sectors 71-78 in a U shape as viewed laterally. The cover sectors 71-78 include upper plate portions 71a-78a, peripheral portions 71b-78b and lower plate portions 71c-78c.

The cover sectors 71-78 are interconnected in the manner of the cover sectors 21-30 of the first preferred embodiment. The cover sectors 72, 73, 74, 75, 76 and 77 are sequentially caused to rotate by the rotation of the first cover sector 71. Pivot holes 81 and 82 are formed to connect the multi-segment cover assembly 70. Pivot pins 83 and 84 are secured to the main body 61 and inserted in respectively the pivot holes 81 and 82. The eighth cover sector 78 is fixed on the main body 61 in FIG. 12.

A tab or grip 86 is secured to the first cover sector 71, and externally protrudes from the main body 61 in the folded position. In FIG. 12, when a user picks up the grip 86 and rotates the first cover sector 71 in the direction C, the multi-segment cover assembly 70 rotates and comes in the spread position. The grip 86 contacts a lateral surface of the main body 61 in the state of the spread position.

In FIG. 11, a deployment sensor 91 as deployment detecting switch, an electromagnet 92 and a stop sensor 93 are disposed in the main body 61. The deployment sensor 91 detects the state of the multi-segment cover assembly 70 in the spread position. The electromagnet 92 as retaining mechanism keeps the multi-segment cover assembly 70 set in the spread position. The stop sensor 93 detects stop of rotation of the turntable 63. Also, an attracting plate of metal 94 is attached to the grip 86.

The operation of the notebook personal computer 60 is described now. At first, the notebook personal computer 60 is turned on. The multi-segment cover assembly 70 is initially in the folded position as illustrated in FIG. 11. The disk 5 is set on the turntable 63 for the purpose of writing or reading to the disk 5 in the disk device 62.

Then the multi-segment cover assembly 70 is rotated to the spread position of FIG. 12. The cover sectors 72-77 are rotated by rotation of the first cover sector 71 to enclose the disk 5 in the manner similar to the first preferred embodiment. When the multi-segment cover assembly 70 is retained by the electromagnet 92 in the spread position, the disk 5 is ready to rotate. The keyboard 67 is manually operated for reading and writing data.

To remove the disk 5 from the notebook personal computer 60, the keyboard 67 is manually operated to release the multi-segment cover assembly 70 from the retention. After this, the multi-segment cover assembly 70 is rotated to the folded position, to remove the disk 5. The multi-segment cover assembly 70 in the folded position is contained in the insertion chambers 61a. Note that an eject button may be disposed laterally on the main body 61, and can be depressed in order to eject the disk 5.

Note that the cover sectors 30 and 78 among the cover sectors 21-30 and 71-78 are supported in a stationary manner. The tenth cover segment 30 may be one portion of the device body 3. The eighth cover segment 78 may be one portion of the main body 61.

In the above embodiments, the multi-segment cover assembly 4, 70 is used. However, other extendable structures may be used, for example, bellows or the like for extending by making one turn. Also, a structure extendable in two directions may be used as a cover assembly. Two distal ends of the structure can be retained on one another when the cover assembly is in the spread position. Cover segments, instead of interconnection in a tight manner in the spread position, may be connected loosely from one another. A disk may be covered by such cover segments with narrow spaces between the cover segments. However, the tight interconnection of the cover segments is preferable for the purpose of ensured protection of the disk.

The number of the cover sectors is not limited to eight or ten, but may be any number equal to or more than two. The shape of the cover sector as viewed laterally, instead of the U shape, may be a C shape, L shape, semicircular shape or other shapes of an open loop. Also, the first and second follower projections 42 and 41 and the drive projection 43 may be formed on an upper plate portion or lower plate portion instead of the peripheral portion.

The shape of the cover segments as viewed downwards, instead of the sector form, may be a triangular form, trapezoid form or the like near to a pie shape. The peripheral portion of the cover segments may be defined with at least one flat surface instead of the curved surface according to arcs of concentric circles. The deployed shape of the multi-segment cover assembly may be polygonal instead of the circular form. The deployed shape of the contour of the cover assembly may be any suitable form defined by making one turn, for example an eccentric looped form, a looped form constituted by arcs and straight lines, and the like.

In the above embodiment, the electronic apparatus is the notebook personal computer 60 with the disk device 62. Also, an electronic apparatus of the invention may be a CD player, DVD player and other apparatuses for use with a disk as optical information recording medium.

In the above embodiments, the multi-segment cover assemblies 4 and 70 are retained by the electromagnets 47 and 92 in the spread position. Other structures with an actuator may be used for retaining the multi-segment cover assemblies 4 and 70, for example, a locking mechanism with a solenoid for opening and closing.

Also, a biasing mechanism such as a spring may be used to bias any of the multi-segment cover assemblies 4 and 70 toward the folded position. Retention of the electromagnets 47 and 92 for the multi-segment cover assemblies 4 and 70 is not released even with the bias of the biasing mechanism. Also, a motor can be used to rotate the multi-segment cover assemblies 4 and 70.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A disk device comprising:
   a turntable for rotating a disk;
   a pickup head for reading and/or writing of data on said disk;
   a device body having said turntable and said pickup head positioned thereon; and
   a cover assembly, secured to said device body in a shiftable manner between a folded position and a spread position, the cover assembly being configured to allow loading and unloading of said disk on said turntable only when in said folded position, and to spread out in a circular direction along a periphery of said disk so as to cover and protect said disk on said turntable when in said spread position.

2. A disk device as defined in claim 1, wherein said cover assembly has an insertion opening, and said insertion opening is open to receive insertion of said disk when said cover assembly is in said folded position, and is closed when said cover assembly is in said spread position.

3. A disk device as defined in claim 1, wherein said cover assembly is transparent to set said disk visible externally.

4. A disk device as defined in claim 1, wherein said cover assembly includes:
   plural rotatable cover sectors, having a rotational axis concentric with said turntable, and having sizes different from one another so as to nest in one another when in said folded position;
   each of said cover sectors having an upper plate portion for covering an upper surface of said disk, a lower plate portion for covering a lower surface of said disk, and a peripheral portion opposed to a peripheral edge of said disk;
   a transmission mechanism for interconnecting said cover sectors positioned adjacently, and for rotating a first one of said cover sectors by transmission when a second one of said cover sectors adjacent to said first cover sector rotates toward said spread position or said folded position.

5. A disk device as defined in claim 4, further comprising a lower recess, formed in said device body, for containing said lower plate portion when said cover assembly is in said folded position.

6. A disk device as defined in claim 4, further comprising:
   an upper arm, disposed to extend from said device body, and positioned higher than said turntable;
   a pivot portion for supporting said upper plate portion of said cover sectors on a lower surface of said upper arm.

7. A disk device as defined in claim 6, wherein said plural cover sectors are first to Nth cover sectors arranged in an outward direction in a nested form;
   when said Nth cover sector rotates, said transmission mechanism rotates said cover sectors sequentially from said (N−1)th cover sector.

8. A disk device as defined in claim 7, wherein said transmission mechanism includes:
   first and second follower projections formed to project from first and second edge portions of an outer surface of each of said first to (N−1)th cover sectors;
   a drive projection formed to project from one edge portion of an inner surface of said second to Nth cover sectors, for engagement with said first follower projection upon rotation toward said spread position, and for engagement with said second follower projection upon rotation toward said folded position.

9. A disk device as defined in claim 4, further comprising:
   a deployment sensor for detecting whether said cover assembly has come to said spread position;
   a controller for allowing said turntable to rotate when said deployment sensor detects that said cover assembly has come to said spread position.

10. A disk device as defined in claim 4, further comprising a retaining mechanism for retaining said cover assembly in said spread position.

11. A disk device as defined in claim 10, further comprising a stop sensor for detecting whether rotation of said turntable has stopped; and
   wherein said retaining mechanism releases retention of said cover assembly when said stop sensor has detected that rotation of said turntable has stopped.

12. A disk device as defined in claim 10, wherein said retaining mechanism includes:
   an attracting plate secured to a foremost one of said cover sectors with respect to a rotational direction toward said spread position; and
   a magnet, positioned on said device body, for attracting said attracting plate.

13. An electronic apparatus having a disk device including a turntable for rotating a disk and a pickup head for reading and/or writing of data on said disk, said electronic apparatus comprising:
a main body having said disk device positioned on a periphery thereof; and
a cover assembly, secured to said main body in a shiftable manner between a folded position and a spread position, the cover assembly being configured to allow loading and unloading of said disk on said turntable only when in said folded position, and to spread out in a circular direction along a periphery of said disk so as to cover and protect said disk on said turntable on an outside of said main body when in said spread position.

14. An electronic apparatus as defined in claim 13, wherein said cover assembly is disposed at a corner of said main body.

* * * * *

UNITED STATES PATENT AND TRADEMARK OFFICE
CERTIFICATE OF CORRECTION

| | | |
|---|---|---|
| PATENT NO. | : 8,032,901 B2 | Page 1 of 1 |
| APPLICATION NO. | : 12/238338 | |
| DATED | : October 4, 2011 | |
| INVENTOR(S) | : Yutaka Kobayashi | |

It is certified that error appears in the above-identified patent and that said Letters Patent is hereby corrected as shown below:

Column 12, Line 4:
"protect said disk on said turntable on an outside of said" should read, --protect said disk on said turntable outside of said--.

Signed and Sealed this
Eighth Day of November, 2011

David J. Kappos
*Director of the United States Patent and Trademark Office*